US009129475B2

(12) United States Patent
Fiorucci et al.

(10) Patent No.: US 9,129,475 B2
(45) Date of Patent: Sep. 8, 2015

(54) METHOD AND SYSTEM FOR MODIFYING A FLOOR MIX OF A GAMING ESTABLISHMENT

(75) Inventors: Jean-Louis Fiorucci, Nice (FR); Carol Desiree Preussler, Henderson, NV (US); Richard Allen Powell, Henderson, NV (US)

(73) Assignee: IGT, Reno, NV (US)

( * ) Notice: Subject to any disclaimer, the term of this patent is extended or adjusted under 35 U.S.C. 154(b) by 1073 days.

(21) Appl. No.: 13/171,084

(22) Filed: Jun. 28, 2011

(65) Prior Publication Data

US 2013/0005472 A1 Jan. 3, 2013

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ........ *G07F 17/3227* (2013.01); *G07F 17/3234* (2013.01)

(58) Field of Classification Search
USPC .............................. 463/20, 22, 25, 27, 40, 42
See application file for complete search history.

(56) References Cited

U.S. PATENT DOCUMENTS

| | | | | |
|---|---|---|---|---|
| 6,517,433 | B2 * | 2/2003 | Loose et al. | 463/20 |
| 2004/0248642 | A1 * | 12/2004 | Rothschild | 463/20 |
| 2010/0228526 | A1 | 9/2010 | Moore, III et al. | |
| 2011/0014972 | A1 | 1/2011 | Herrmann et al. | |
| 2011/0053680 | A1 * | 3/2011 | Acres | 463/25 |

OTHER PUBLICATIONS

Extended European Search Report for corresponding EP Application No. 12173535.1 mailed Nov. 7, 2012.

* cited by examiner

*Primary Examiner* — Adetokunbo O Torimiro
(74) *Attorney, Agent, or Firm* — Griffiths & Seaton PLLC

(57) ABSTRACT

A method and a slot floor mix recommendation system for use with a server-based gaming network are provided. The system includes a memory device, a processor in communication with the memory device, and at least one data acquisition network. The system further includes a plurality of electronic gaming machines (EGM), at least some having dissimilar manufacturers, makes, models, and attributes communicatively coupled to the at least one data acquisition network, at least one historical data repository, a gaming machine recommender configured to determine a composition of themes available for selection on each of the plurality of EGMs using a relative performance of each available theme compared to each other available theme over at least one historical period and with respect to at least one attribute, and a reporter configured to output the determined composition.

13 Claims, 3 Drawing Sheets

METHOD AND SYSTEM FOR MODIFYING A FLOOR MIX OF A GAMING ESTABLISHMENT

BACKGROUND OF THE INVENTION

The field of the invention relates generally to server-based network systems, and more specifically, to methods and systems for modifying a mix of machines based on a performance of a selectable attribute or combination of attributes.

At least some known gaming establishments cater to customers or players with varying interests. To increase enjoyment of players and to increase revenue generated by gaming machines, the gaming establishments tailor the gaming machine attributes to accommodate player preferences. Some machine attributes may be modifiable by the player manually to accommodate a current preference of the player. Attributes may also be automatically configured based on a player preference history stored on the gaming machine, a server communicatively coupled to the gaming machine or on a memory carried on the player in the form of a card, jewelry, or even an article of clothing. At least some attributes may be selectable by the operator of the gaming establishment. Optimizing the performance of the equipment is essential to maximize return on very significant investment in hardware and real estate in the gaming establishment. However, determining which attributes to include in a plurality of gaming machines at any given time is often done using system default denomination values and default theme data from the gaming machines.

BRIEF DESCRIPTION OF THE INVENTION

In one embodiment, a slot floor mix recommendation system for use with a server-based gaming network includes a memory device, a processor in communication with the memory device, and at least one data acquisition network. The system further includes a plurality of electronic gaming machines (EGM), at least some having dissimilar manufacturers, makes, models, and attributes communicatively coupled to the at least one data acquisition network, at least one historical data repository, a gaming machine recommender configured to determine a composition of themes available for selection on each of the plurality of EGMs using a relative performance of each available theme compared to each other available theme over at least one historical period and with respect to at least one attribute, and a reporter configured to output the determined composition.

In another embodiment, a computer-based method of modifying a floor mix of a plurality of gaming machines includes determining a first subset of themes available for play on each of the plurality of gaming machines, for each gaming machine, determining historical values for at least one attribute associated with at least one of a theme in the subset of themes and the gaming machine, determining a second subset of themes for each of the plurality of gaming machines using the determined historical values, and transmitting the second subset of themes to each respective gaming machine.

In yet another embodiment, one or more non-transitory computer-readable storage media includes computer-executable instructions embodied thereon, wherein when executed by at least one processor, the computer-executable instructions cause the processor to determine a first subset of themes available for play on each of the plurality of gaming machines, determine historical values for at least one attribute associated with at least one of a theme in the subset of themes and the gaming machine, determine a second subset of themes for each of the plurality of gaming machines using the determined historical values, and transmit the second subset of themes to each respective gaming machine.

BRIEF DESCRIPTION OF THE DRAWINGS

FIG. 1 is a schematic block diagram of a server-based gaming network in accordance with an exemplary embodiment of the present invention;

FIG. 2 is a perspective view of an electronic gaming machine (EGM) in accordance with an exemplary embodiment of the present invention; and FIG. 3 is a schematic block diagram of a slot floor mix recommendation system shown in FIG. 1.

DETAILED DESCRIPTION OF THE INVENTION

The following detailed description illustrates embodiments of the invention by way of example and not by way of limitation. It is contemplated that the invention has general application to modifying a floor mix of a plurality of gaming machines to optimize the performance of the gaming machines based on a selectable attribute or combination of selectable attributes. It is contemplated that the invention has general application to optimizing a machine mix in industrial, commercial, and residential applications.

As used herein, an element or step recited in the singular and preceded with the word “a” or “an” should be understood as not excluding plural elements or steps, unless such exclusion is explicitly recited. Furthermore, references to “one embodiment” of the present invention are not intended to be interpreted as excluding the existence of additional embodiments that also incorporate the recited features.

Embodiments of the present invention describe systems and methods for optimizing a slot floor mix. The systems and methods enable tuning of a mix of gaming machines on a casino floor across time in order to get an ideal balance of denominations, themes, game families, and other game attributes. Gaming machines may be configured to support user selectable or system changeable denominations and themes in addition to other game attributes. Embodiments of the present invention take advantage of this multi game—multi denomination information and recommends an ideal composition of multi game—multi denomination mix based on relative performance of each gaming machine to the rest of the gaming machines on the floor.

In addition to analyzing single game attributes, embodiments of the present invention provide analysis based on a combination of many different game attributes to recommend the most profitable combination such as, but not limited to, themes and denominations by zone, bank, area, or other attribute.

Embodiments of the present invention also provide systems and methods for automatically changing the denominations and game themes on the floor based on the analysis.

Figure 1:
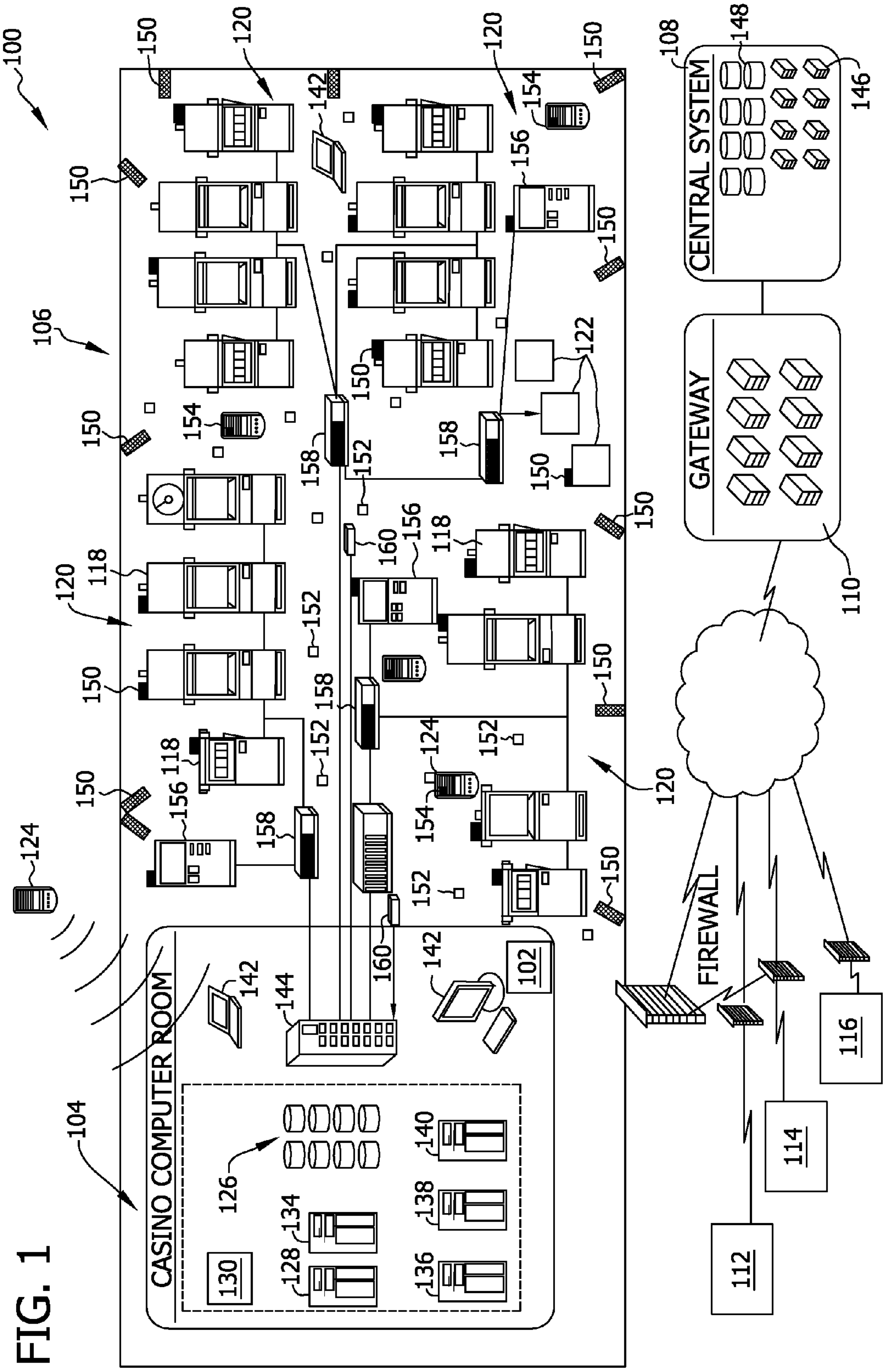
FIGS. 1-3 show exemplary embodiments of the method and apparatus described herein.

FIG. 1 is a schematic block diagram of a server-based gaming network 100 in accordance with an exemplary embodiment of the present invention. In the exemplary embodiment, network 100 includes a slot floor mix recommendation system 102 incorporated therein. In an embodiment, slot floor mix recommendation system 102 is a stand alone system communicatively coupled to network 100. In various embodiments, slot floor mix recommendation system 102 is incorporated within various components of network 100.

Network 100 provides methods and devices for managing one or more networked gaming establishments. Network 100 may be embodied in what is known as a server-based gaming network, Sbx™ network. In one embodiment, network 100 permits the convenient provisioning of networked gaming machines and other devices relevant to casino operations. Game themes may be easily and conveniently added or changed, if desired. Related software, including but not limited to player tracking software and peripheral software may be downloaded to networked gaming machines, mobile gaming devices, thin clients and/or other devices, such as kiosks, networked gaming tables, player stations.

In some implementations, servers or other devices of a central system will determine game outcomes and/or provide other wager gaming functionality. In some such implementations, wagering games may be executed primarily on one or more devices of a central system, such as a server, a host computer, etc. For example, wager gaming determinations such as interim and final game outcomes, and bonuses may be made by one or more servers or other networked devices. Player tracking functions, accounting functions and some display-related functions associated with wagering games may be performed, at least in part, by one or more devices of a casino network and/or of a central system.

In the exemplary embodiment, network 100 includes a casino computer room 104 and networked devices of a gaming establishment 106. Gaming establishment 106 is configured for communication with a central system 108 via a gateway 110. Other gaming establishments 112, 114, and 116 are also configured for communication with central system 108.

Gaming establishment 106 includes multiple gaming machines 118. Some of gaming machines 118 form a cluster or "bank" 120 of gaming machines 118. Gaming machines 118 are configured for communication with one or more devices of casino computer room 104 or similar devices disposed elsewhere in gaming establishment 106. Some of gaming machines 118 may be configured to read from, and/or write information to, a portable instrument such as but not limited to, a ticket and a player loyalty device.

In the exemplary embodiment, gaming establishment 106 also includes a bank of networked gaming tables 122. However, network 100 may be implemented in gaming establishments having any number of gaming machines, gaming tables, etc. It will be appreciated that many gaming establishments 106 include hundreds or even thousands of gaming machines 118, gaming tables 122 and/or mobile devices 124, not all of which are necessarily associated bank 120 and some of which may not be connected to network 100. At least some of gaming machines 118 and/or mobile devices 124 may be "thin clients" that are configured to operate, at least in part, according to instructions from another device (such as a server).

A plurality of storage devices 126, Sbx™ server 128, License Manager 130, servers 134, 136, 138, and 140, host device(s) 142, and main network device 144 are disposed within computer room 104 of gaming establishment 106. In practice, more or fewer devices may be used. Depending on the implementation, some such devices may reside elsewhere in gaming establishment 106.

One or more of the devices in computer room 104 (or similar devices disposed elsewhere in gaming establishment 106 or in gaming establishment 112, 114, or 116) may be configured to provide functionality relevant to embodiments of the present invention. For example, one or more of servers 134, 136, 138, or 140 may be configured for communication with gaming machines 118 that are configured to provide a subset of themes for selection by a player. For example, one or more such servers may be configured to provide a selection of a subset of four themes from a large number of available themes.

Accordingly, in some embodiments at least some gaming establishments may be configured for communication with one another. In this example, gaming establishments 112, 114, and 116 are configured for communication with casino computer room 104. Such a configuration may allow devices and/or operators in casino 106 to communicate with and/or control devices in other casinos. In some such implementations, a server (or another device) in computer room 104 may be configured to communicate with and/or control devices in gaming establishments 112, 114, and 116. Conversely, devices and/or operators in another gaming establishment may communicate with and/or control devices in casino 106.

Some of these servers in computer room 104 may be configured to perform tasks relating to accounting, player loyalty, bonusing/progressives, configuration of gaming machines, etc. A Radius server and/or a DHCP server may also be configured for communication with the gaming network. In various embodiments, Sbx™ server 128 and the other servers shown in FIG. 1 include or are in communication with clustered CPUs, redundant storage devices, including backup storage devices, switches, etc. Such storage devices may include a redundant array of independent disks (RAID) array, back-up hard drives and/or tape drives, etc.

In various embodiments, many of these devices (including but not limited to License Manager 130, servers 134, 136, 138, and 140, and main network device 144) are mounted in a single rack with Sbx™ server 128. Accordingly, many or all such devices will sometimes be referenced in the aggregate as an "Sbx™ server." However, in alternative implementations, one or more of these devices is in communication with Sbx™ server 128 and/or other devices of the network but located elsewhere. For example, some of the devices could be mounted in separate racks within computer room 104 or located elsewhere on the network. Moreover, in some implementations large volumes of data may be stored elsewhere, e.g., via a storage area network ("SAN").

Computer room 104 may include one or more operator consoles or other host devices that are configured for communication with other devices within and outside of computer room 104. Such host devices may be provided with software, hardware and/or firmware for implementing functions described herein. However, such host devices need not be located within computer room 104. Wired host devices 142 (which are desktop and laptop computers in this example) and wireless devices 124 (which are PDAs in this example) may be located elsewhere in gaming establishment 106 or at a remote location.

Some embodiments include devices for implementing access control, security and/or other functions relating to the communication between different devices on the network. One or more devices in central system 108 may also be configured to perform, at least in part, tasks specific to embodiments of the present invention. For example, one or more servers 146, storage devices and/or host devices 142 of central system 108 may be configured to implement the functions described in detail elsewhere herein. One or more servers 146, storage devices 148 and/or host devices 142 of central system 108 may maintain player account information.

Some gaming networks 100 provide features for gaming tables that are similar to those provided for gaming machines, including but not limited to bonusing, player loyalty/player tracking, the use of cashless instruments, etc. Some configurations can provide automated, multi-player roulette, black-jack, baccarat, and other table games. The table games may be conducted by a dealer and/or by using some form of automation, which may include an automated roulette wheel, an electronic representation of a dealer, etc. In some such implementations, devices such as cameras 150, radio frequency identification devices 152 and 154, etc., may be used to identify and/or track patrons, playing cards, chips, etc. Some of gaming tables 122 may be configured for communication with individual player terminals (not shown), which may be configured to accept bets, present an electronic representation of a dealer, indicate game outcomes, etc.

Moreover, some such automated gaming tables 122 and/or associated player terminals may include, or may be configured for communication with, a device that includes a coin-out meter, a ticket reader, a card reader, a ticket printer, and/or other related features. In some implementations, one such device may provide such functionality to a plurality of automated gaming tables 122 and/or associated player terminals.

Gaming establishment 106 also includes networked kiosks 156. Kiosks 156 may include card readers, ticket readers, printers, a user interface system, one or more displays, etc. Depending on the implementation, kiosks 156 may be used for various purposes, including but not limited to cashing out, prize redemption, redeeming points from a player loyalty program, redeeming "cashless" indicia such as bonus tickets, smart cards, etc.

Kiosks 156 may be configured to read information from, and/or write information to, a portable instrument such as a smart card, a ticket, a card having a magnetic strip, etc. The corresponding gaming devices are preferably configured for communication with such kiosks 156 and vice versa. Accordingly, some such kiosks 156 may include a wireless interface that is configured for communication with mobile gaming devices 124.

In the exemplary embodiment, each bank 120 has a corresponding switch 158. Each switch 158 is configured for communication with one or more devices in computer room 104 via main network device 144, which combines switching and routing functionality in this example. Although various communication protocols may be used, some preferred implementations use the Gaming Standards Association's G2S Message Protocol. Some systems may use a gaming-industry-specific transport layer called CASH™, which offers additional functionality and security.

Gaming establishment 106 may also include an RFID network, implemented in part by RFID switches 160 and multiple RFID readers 152. An RFID network may be used, for example, to track objects such as mobile gaming devices 124, which include RFID tags 154, patrons, chips, player loyalty devices, etc., in the vicinity of gaming establishment 106.

Various alternative network topologies can be used to implement different aspects of the invention and/or to accommodate varying numbers of networked devices. For example, some gaming establishments may include cameras 150 for implementing advanced player tracking, player navigation or other functionality. Gaming establishments with large numbers of gaming machines 118 may require multiple instances of some network devices (e.g., of main network device 144, which combines switching and routing functionality in this example) and/or the inclusion of other network devices not shown in FIG. 1. Some embodiments may include one or more middleware servers disposed between kiosks 156, RFID switches 160 and/or bank switches 158 and one or more devices (e.g., a corresponding server, router or other network device) in computer room 104. Such middleware servers can provide various useful functions, including but not limited to the filtering and/or aggregation of data received from switches, from individual gaming machines and from other devices. Some implementations of the invention include load-balancing methods and devices for otherwise managing network traffic.

Figure 2:
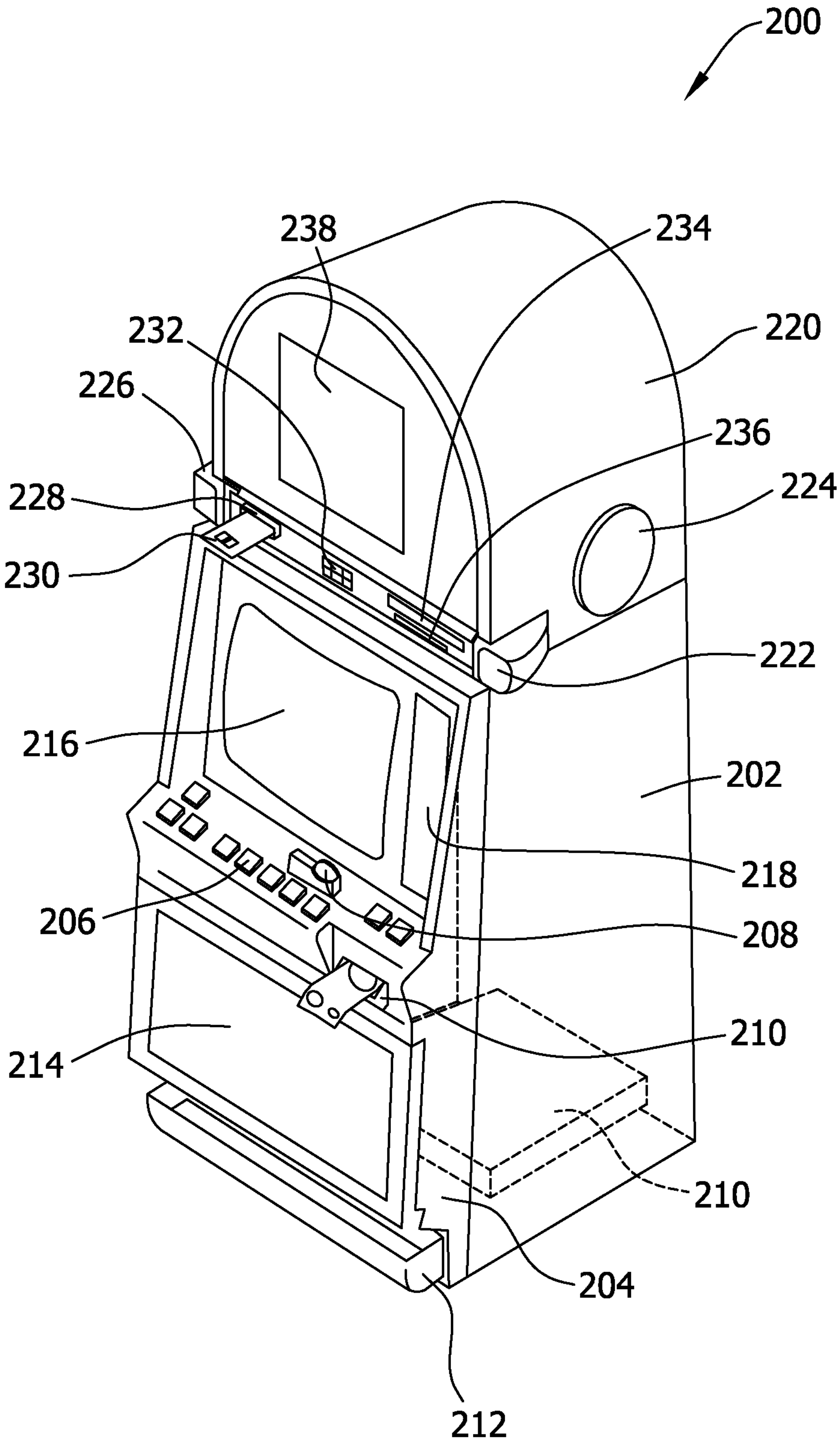

FIG. 2 is a perspective view of an electronic gaming machine (EGM) 200 in accordance with an exemplary embodiment of the present invention. In the exemplary embodiment, EGM 200 includes a main cabinet 202, which generally surrounds an interior of EGM 200 and is viewable by users or players. Main cabinet 202 may include a main door 204 on the front of EGM 200, which opens to provide access to the interior of EGM 200. Additional components may be attached to the main door 204, including player-input switches or buttons 206, a coin acceptor 208, a bill validator 210, a coin tray 212, and a belly glass 214. A video display monitor 216 and an information panel 218 may be viewable through the main door 204. Display monitor 216 may be any conventional electronically controlled video monitor such as a cathode ray tube, or a flat-panel monitor using technology such as plasma, LCD, or LED. Information panel 218 may be a back-lit, silk screened glass panel with lettering to indicate general game information including, for example, a game denomination (e.g. $0.25 or $1). Player-input switches 206, bill validator 210, video display monitor 216, and information panel 218 are all devices used by a player to initiate and/or play a game on EGM 200. These devices may be controlled by circuitry (e.g. a master gaming controller) housed inside main cabinet 202 of EGM 200. Many different types of games, including mechanical slot games, video slot games, video poker, video black jack, video pachinko, and lottery, may be provided by EGM 200. Typically, games provided by EGM 200 are electronic games of chance found in a casino and subject to jurisdictional regulations governing gambling and casino operations in general. The various games presentable on an EGM 200 may be differentiated according to themes, sounds, graphics, game type (e.g., slot game vs. card game), denomination, number of paylines, maximum jackpot, progressive or non-progressive style, bonus games, etc. EGM 200 may be operable to allow a player to select a game of chance to play from a plurality of instances available on EGM 200. For example, EGM 200 may provide a menu with a list of the instances of games that are available for play on EGM 200 and a player may be able to select from the list a first instance of a game of chance that they wish to play.

The various instances of games available for play on EGM 200 may be stored as game software on a mass storage device in EGM 200 or may be generated on a remote gaming device but then displayed on EGM 200. EGM 200 may execute game software, such as but not limited to video streaming software that allows the game to be displayed on EGM 200. When an instance of a game is stored on EGM 200, it may be loaded from the mass storage device into a RAM for execution. In some cases, after a selection of an instance, the game software that allows the selected instance to be generated may be downloaded from a remote gaming device, such as another gaming machine.

EGM 200 may also include a top box 220, which sits on top of main cabinet 202. Top box 220 may house a number of devices, which may be used to add features to a game being played on EGM 200, including speakers 222, 224, 226, a ticket printer 228 that prints bar-coded tickets 230, a key pad 232 for entering player tracking information, a florescent display 234 for displaying player tracking information, and a card reader 236 for entering a magnetic striped card containing player tracking information. Card reader 236 is one example of a verification interface. Ticket printer 228 may be used to print tickets for a cashless ticketing system. Further, top box 220 may house different or additional devices than those shown in FIG. 2. For example, the top box 220 may contain a bonus wheel (not shown) or a back-lit silk-screened panel (not shown) that may be used to add bonus features to the game being played on EGM 200. As another example, the top box 220 may contain a display 238 for displaying information about a progressive jackpot offered on EGM 200. During a game, the various electronic devices within EGM 200 may be controlled and powered, in part, by circuitry 240 housed within main cabinet 202. Circuitry 240 may include, for example, a logic system having one or more processors such as a master game controller, memory configured for communication with the logic system and for storing game software, and coin-in and coin-out metering circuits, as well as power supplies and other supporting digital and analog electronics.

It should be understood that EGM 200 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upward. As another example, a game may be generated in on a host computer and may be displayed on a remote terminal or a remote gaming device. The remote gaming device may be connected to the host computer via a wired or wireless network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further, a gaming machine or server may include gaming logic for commanding a remote gaming device to render an image from a virtual camera in a 3-D gaming environments stored on the remote gaming device and to display the rendered image on a display located on the remote gaming device. Thus, various embodiments of the present invention, as described herein, can be deployed on modified versions of many gaming machines now available, on other types of devices, such as those described above or on other devices that may be hereafter developed.

Figure 3:
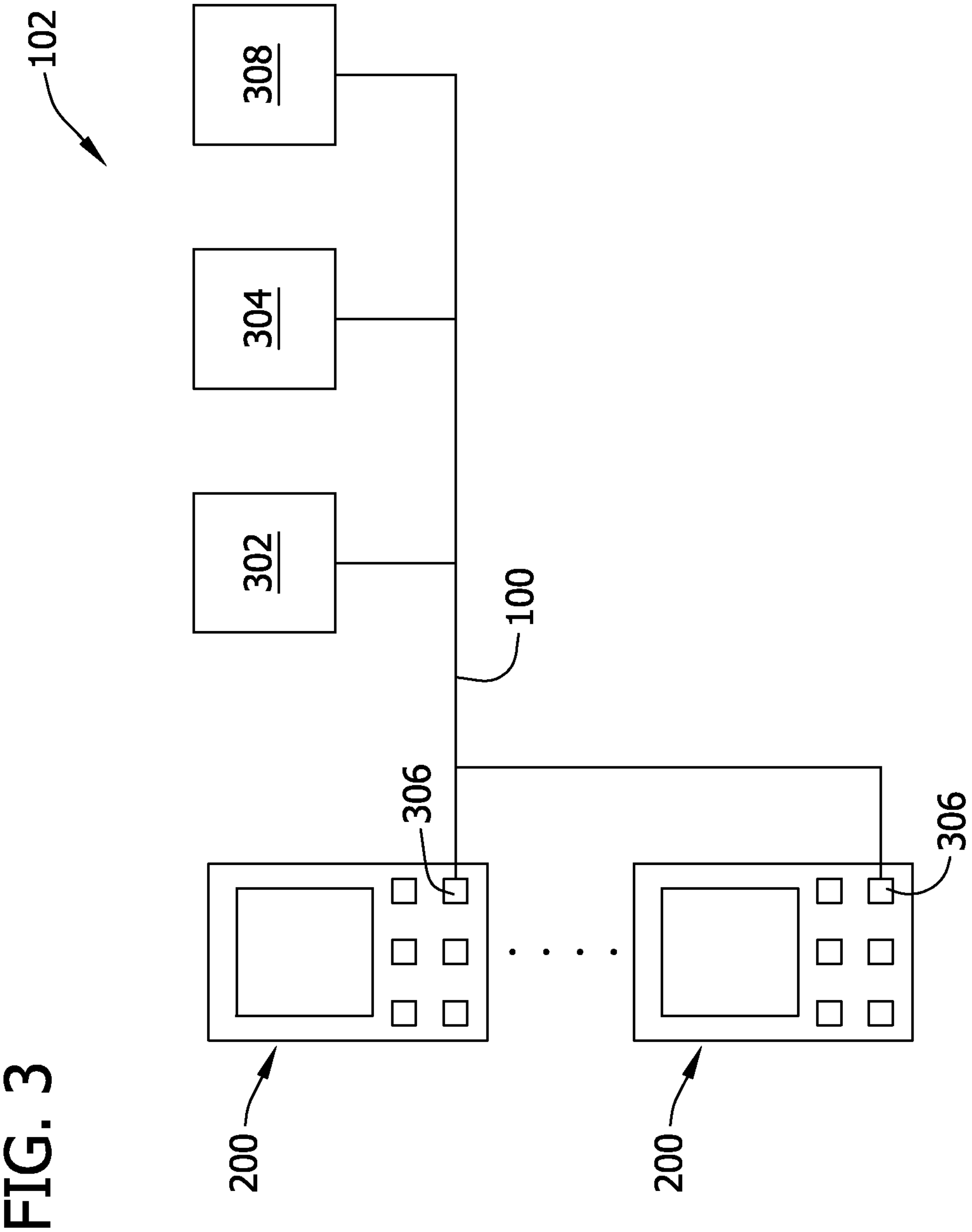

FIG. 3 is a schematic block diagram of a slot floor mix recommendation system 102 (shown in FIG. 1). In the exemplary embodiment, slot floor mix recommendation system 102 includes an analytical engine 302, at least one EGM 200, a data acquisition network 100, a historical data repository 304, a means of obtaining slot play information 306, and a means of configuring gaming devices 308. Each of EGMs 200 send slot play information across network 100 to historical data repository 304. Analytical engine 302 optimizes the floor composition or mix of subsets of a plurality of themes playable on EGMs 200 by using historical data repository 304 combined with mathematical and statistical calculations. The system configures EGMs 200, either automatically or manually by user input, to match the recommended optimization.

Network 100 includes a variety of gaming devices positioned in various locations across a casino. EGMs 200 vary based on game manufacturer, game make, game model, cabinet style, and a set of system-configurable gaming device attributes. These configurable gaming device attributes include, among other things, denomination, math model, theme, pay table, number of lines, maximum bet, number of themes available, default theme, default denomination, and game family.

Each of EGMs 200 connects to at least one data acquisition network, which may include network 100 and/or networks communicatively coupled to network 100. EGMs 200 transmit game play information through the data acquisition network to historical data repository 304. Historical data repository 304 stores the historical game play information for future analysis. Additionally, slot floor mix recommendation system 102 sends commands to apply configuration changes for each EGM 200, based on analysis of the data, through the data acquisition network.

Analytical engine 302 optimizes the performance of EGMs 200 by changing the floor composition of the themes and/or attributes available for selection by a player. The floor composition is optimized based on the relative performance of each EGM 200 compared to all other EGMs 200 over at least one historical period while considering at least one attribute of EGMs 200. The historical period is selectable by a user, such as, but not limited to, the casino operator and may be a relatively short time period, for example, an hour, or may be a relatively long time period, for example, a week, a month, or longer. Analytical engine 302 determines relative performance of EGMs 200 based on, among other things, the comparison of win per day, coin in, games played, occupancy rates, time on device, cabinet location, and combinations thereof. The historical period includes, but not limited to, weekends, shifts, time of day, day of the week, holidays, weather, and seasons. For example, if the default theme American Idol on average produces a 50% higher coin in on Mondays than Wheel of Fortune, analytical engine 302 will increase the number of American Idol games and decrease the number of Wheel of Fortune games during Mondays.

Slot floor mix recommendation system 102 is configured to recommend a composition of floor mix based on a relative performance to mix composition. The floor mix relates to game themes available for selection by players on the plurality of EGMs 200 that populate gaming establishment 106. Using server based network 100, several themes may be made available on each EGM 200 at any given time. The mix of different themes downloaded to each EGM 200 is evaluated by slot floor mix recommendation system 102 for optimization of a selected parameter, for example, games played and revenue generated. Other parameters relating to any EGM 200 or to all EGMs 200 collectivity can be evaluated to determine a floor mix of themes available. Typically, the selected parameter is optimized, for example, optimizing the floor mix to achieve the most revenue. However, different promotions or marketing opportunities may call for different goals than optimization of the selected parameter.

In various embodiments, slot floor mix recommendation system 102 is configured to automatically change the floor composition based on relative performance analytics. In other embodiments, slot floor mix recommendation system 102 is configured to only report on the performance of the floor composition based on relative performance analytics. Slot floor mix recommendation system 102 may also recommend a floor composition for implementation by the casino operator or other user. In one embodiment, the relative performance analytics is determined using:

$$N_{ideal} = \frac{P_{avg} * N_{current}}{P_{floor\ avg}}, \tag{1}$$

where $N_{current}$ represents the current number of cabinets with a certain attribute, $P_{avg}$ represents the average performance of those cabinets, $P_{floor\ avg}$ represents the floor wide average cabinet performance, and $N_{ideal}$ represents the ideal number of cabinets to deploy with this attribute based on this method.

Moreover, slot floor mix recommendation system 102 is configured to automatically modify a saturation of the floor composition. As used herein, saturation refers to a maximum number of each type of attribute on the casino floor, for example, a maximum number of occurrences of each theme on the casino floor that will give the maximum profit.

For example, to determine the ideal number of cabinets to deploy the "free games" to with respect to attribute "Net Win", wherein there are fifty cabinets on the floor, of which ten currently have the 'free games' game family. If, for example, the average Net Win for these ten cabinets is $300,000 and the average Net Win for all cabinets on the casino floor is $520,000. Computing formula I for $$N_{ideal} = \frac{\$300{,}000 * 10}{\$520{,}000} = 5.8$$

Therefore, slot floor mix recommendation system 102 would recommend or automatically adjust to only having 6 cabinets with free games (instead of the current 10).

In another example, using a larger scale set of themes and the same attribute of "Net Win", three game families are analyzed at once. There are still fifty cabinets total with an average Net Win of $520,000, for example.

TABLE 1

| Game Family | Avg Net Win | Current # of Cabinets | Ideal # of Cabinets |
|---|---|---|---|
| Free Games | $300,000 | 10 | 6 |
| Stacked Wilds | $500,000 | 25 | 24 |
| Super Hyper Pays | $700,000 | 15 | 20 |
| TOTALS: | $520,000 | 50 | 50 |

As a result, slot floor mix recommendation system 102 would modify the numbers of instances of the game families as shown above to optimize the net win for the entire floor for the three game families. Any number of attributes and game families or themes may be used in combination similarly to optimize the number of instances of the game families of themes available on the floor.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is analyzing a performance of a group of machines with respect to an attribute associated with the machines or a combination of attributes associated with the machines and modifying a mix of those machines to optimize the performance of the group of machines. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of using a server-based network ability to download and configure functionality of a plurality of gaming machines communicatively coupled to the network provides a cost-effective and reliable means for facilitating recommending an improved floor mix of the gaming machines. More specifically, the methods and systems described herein facilitate optimizing a slot floor mix based on a selectable attribute of combination of attributes. As a result, the methods and systems described herein facilitate modifying a floor mix of a plurality of gaming machines to optimize a performance of the plurality of gaming machines in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-based method of modifying a floor mix of a plurality of gaming machines, said method comprising:

determining a first subset of themes available for play on each of the plurality of gaming machines;

for each gaming machine, determining historical values for at least one attribute associated with at least one of a theme in the subset of themes and the gaming machine;

determining a second subset of themes for each of the plurality of gaming machines using the determined historical values; and transmitting the second subset of themes to each respective gaming machine, wherein said determining a second subset of themes for each of the plurality of gaming machines comprises determining a second subset of themes for each of the plurality of gaming machines using a value of an attribute of at least one of a gaming machine and each theme of the first subset of themes relative to an average of a value of an attribute of at least one of the others of the plurality of gaming machines and each other theme of the first subset of themes.

2. The method in accordance with claim 1, further comprising for each gaming machine:

determining an event unrelated to the plurality of gaming machines occurring proximate the plurality of gaming machines; and determining a second subset of themes for each of the plurality of gaming machines using the determined event.

3. The method in accordance with claim 2, further comprising associating at least some themes with the determined event.

4. The method in accordance with claim 2, further comprising associating sporting themes with a determined sporting event.

5. The method in accordance with claim 2, further comprising associating racing themes with a determined racing event.

6. The method in accordance with claim 1, wherein said determining a second subset of themes for each of the plurality of gaming machines comprises determining a second subset of themes for each of the plurality of gaming machines using a number of games played of each theme of the first subset of themes relative to an average of a number of games played of each other theme of the first subset of themes.

7. The method in accordance with claim 1, wherein said determining a second subset of themes for each of the plurality of gaming machines comprises determining a second subset of themes for each of the plurality of gaming machines using a revenue generated by each theme of the first subset of themes relative to an average of revenue generated by each other theme of the first subset of themes.

8. The method in accordance with claim 6, wherein said determining a second subset of themes for each of the plurality of gaming machines comprises determining an ideal number of each of the plurality of themes that are included in the second subset of themes for the plurality of gaming machines using:

$$Nideal = \frac{P_{avg} * N_{current}}{P_{floor\ avg}},$$

where

Nideal represents the ideal number of themes operating on the plurality of gaming machines, $P_{avg}$ represents the average of the performance of one instance of the theme, $N_{current}$ represents the current number of instances of the theme, and $P_{flooravg}$ represents the average performance of all instances of the theme on the floor.

9. The method in accordance with claim 1, further comprising transmitting the second subset of themes to each respective gaming machine.

10. The method in accordance with claim 1, further comprising generating a report recommending the second subset of themes for each respective gaming machine.

11. One or more non-transitory computer-readable storage media having computer-executable instructions embodied thereon, wherein when executed by at least one processor, the computer-executable instructions cause the processor to:

determine a first subset of themes available for play on each of the plurality of gaming machines;

determine historical values for at least one attribute associated with at least one of a theme in the subset of themes and the gaming machine;

determine a second subset of themes for each of the plurality of gaming machines using the determined historical values; and transmit the second subset of themes to each respective gaming machine, wherein said determining the second subset of themes for each of the plurality of gaming machines comprises determining a second subset of themes for each of the plurality of gaming machines using a value of an attribute of at least one of a gaming machine and each theme of the first subset of themes relative to an average of a value of an attribute of at least one of the others of the plurality of gaming machines and each other theme of the first subset of themes.

12. The computer-readable storage media of claim 11, wherein the computer-executable instructions further cause the processor to:

determine an event unrelated to the plurality of gaming machines occurring proximate the plurality of gaming machines; and determine a second subset of themes for each of the plurality of gaming machines using the determined event.

13. The computer-readable storage media of claim 11, wherein the computer-executable instructions further case the processor to determine a number of each of the plurality of themes that are included in the second subset of themes for the plurality of gaming machines using:

$$Nideal = \frac{P_{avg} * N_{current}}{P_{floor\ avg}},$$

where

Nideal represents the ideal number of themes operating on the plurality of gaming machines, $P_{avg}$ represents the average of the performance of one instance of the theme, $N_{current}$ represents the current number of instances of the theme, and $P_{flooravg}$ represents the average performance of all instances of the theme on the floor.

* * * * *